US011720890B2

(12) United States Patent
Mundis et al.

(10) Patent No.: US 11,720,890 B2
(45) Date of Patent: Aug. 8, 2023

(54) AUTHORIZATION OF USE OF CRYPTOGRAPHIC KEYS

(71) Applicant: ENTIT SOFTWARE LLC, Sanford, NC (US)

(72) Inventors: Jesse Mundis, Cupertino, CA (US); Joshua Lubliner, Cupertino, CA (US)

(73) Assignee: Micro Focus LLC, Santa Clara, CA (US)

( * ) Notice: Subject to any disclaimer, the term of this patent is extended or adjusted under 35 U.S.C. 154(b) by 519 days.

(21) Appl. No.: 16/093,832

(22) PCT Filed: Apr. 22, 2016

(86) PCT No.: PCT/US2016/028788
§ 371 (c)(1),
(2) Date: Oct. 15, 2018

(87) PCT Pub. No.: WO2017/184160
PCT Pub. Date: Oct. 26, 2017

(65) Prior Publication Data
US 2019/0080321 A1   Mar. 14, 2019

(51) Int. Cl.
*G06Q 20/38* (2012.01)
*G06Q 20/06* (2012.01)
(Continued)

(52) U.S. Cl.
CPC ....... *G06Q 20/3829* (2013.01); *G06Q 20/065* (2013.01); *G06Q 20/0855* (2013.01);
(Continued)

(58) Field of Classification Search
CPC ............. G06Q 20/3829; G06Q 20/065; G06Q 20/0855; G06Q 20/123; G06Q 20/3674; G06Q 20/401
See application file for complete search history.

(56) References Cited

U.S. PATENT DOCUMENTS 5,751,813 A * 5/1998 Dorenbos ........... H04L 63/0442
713/153
6,990,468 B1   1/2006 Berson et al.
(Continued)

FOREIGN PATENT DOCUMENTS

CA          2941280 A1 *  3/2018  ........... G06F 21/602
KR    1020160024185 A    3/2016
(Continued)

OTHER PUBLICATIONS

International Searching Authority., International Search Report and Written Opinion dated Jan. 20, 2017 for PCT Application No. PCT/US2016/028788 Filed Apr. 22, 2016, 10 pages.
(Continued)

*Primary Examiner* — Jacob C. Coppola
*Assistant Examiner* — Terry Nathan Murray
(74) *Attorney, Agent, or Firm* — Sheridan Ross P.C.

(57) ABSTRACT

Examples herein involve authorization of use of cryptographic keys based on cryptocurrency payments. An example method includes analyzing a request for a cryptographic key of a key server where the request may be received from a requesting device and the cryptographic key is used to decrypt or encrypt a message of the request, and authorizing use of the cryptographic key to decrypt or encrypt the message based on a balance in a cryptocurrency wallet associated with the request.

18 Claims, 9 Drawing Sheets

(51) Int. Cl.
*G06Q 20/08* (2012.01)
*G06Q 20/40* (2012.01)
*G06Q 20/12* (2012.01)
*G06Q 20/36* (2012.01)

(52) U.S. Cl.
CPC ....... *G06Q 20/123* (2013.01); *G06Q 20/3674* (2013.01); *G06Q 20/401* (2013.01)

(56) References Cited

U.S. PATENT DOCUMENTS

| | | | | |
|---|---|---|---|---|
| 7,421,583 | B1* | 9/2008 | Berson | G07F 17/0014 |
| | | | | 380/278 |
| 7,668,093 | B1* | 2/2010 | Clubb | G06Q 20/405 |
| 8,118,222 | B2 | 2/2012 | Barcelou | |
| 10,057,225 | B1* | 8/2018 | Hayes | H04L 63/0823 |
| 10,262,321 | B1* | 4/2019 | Ramanathan | G06Q 20/3829 |
| 10,270,587 | B1* | 4/2019 | Wu | H04L 9/0825 |
| 2001/0036272 | A1* | 11/2001 | Hirayama | G06Q 20/28 |
| | | | | 725/1 |
| 2001/0037210 | A1* | 11/2001 | Hirayama | G06Q 30/02 |
| | | | | 726/21 |
| 2001/0037378 | A1* | 11/2001 | Hirayama | H04N 21/8355 |
| | | | | 709/219 |
| 2002/0010681 | A1* | 1/2002 | Hillegass | G06Q 20/06 |
| | | | | 705/59 |
| 2002/0157012 | A1* | 10/2002 | Inokuchi | G11B 20/00557 |
| | | | | 713/193 |
| 2003/0046534 | A1* | 3/2003 | Alldredge | G06Q 20/383 |
| | | | | 713/153 |
| 2004/0083258 | A1* | 4/2004 | Haneda | G10L 19/24 |
| | | | | 709/201 |
| 2004/0105544 | A1* | 6/2004 | Haneda | H04N 7/1675 |
| | | | | 380/231 |
| 2006/0236395 | A1* | 10/2006 | Barker | H04L 63/1416 |
| | | | | 726/23 |
| 2008/0184283 | A1* | 7/2008 | Maislen | G06Q 20/3674 |
| | | | | 705/67 |
| 2012/0131354 | A1 | 5/2012 | French | |
| 2014/0003608 | A1 | 1/2014 | MacMillan et al. | |
| 2014/0244506 | A1 | 8/2014 | Gramling | |
| 2014/0369501 | A1 | 12/2014 | Gidwani | |
| 2015/0287026 | A1 | 10/2015 | Yang et al. | |
| 2015/0324789 | A1 | 11/2015 | Dvorak et al. | |
| 2016/0071096 | A1 | 3/2016 | Rosca | |
| 2016/0148197 | A1* | 5/2016 | Dimmick | G06Q 20/3674 |
| | | | | 705/67 |
| 2016/0203477 | A1* | 7/2016 | Yang | G06Q 20/405 |
| 2016/0232527 | A1* | 8/2016 | Patterson | G06Q 20/405 |
| 2016/0277380 | A1* | 9/2016 | Wagner | H04L 63/0861 |
| 2017/0063531 | A1* | 3/2017 | Sullivan | G06F 21/6209 |
| 2017/0116608 | A1* | 4/2017 | Forzley | G06Q 20/405 |
| 2017/0228723 | A1* | 8/2017 | Taylor | H04L 63/123 |
| 2017/0300898 | A1* | 10/2017 | Campero | H04L 63/0861 |
| 2018/0075247 | A1* | 3/2018 | Campero | H04L 9/3213 |
| 2019/0080321 | A1* | 3/2019 | Mundis | G06Q 20/0855 |
| 2019/0108542 | A1* | 4/2019 | Durvasula | H04L 9/3297 |
| 2019/0108543 | A1* | 4/2019 | Chan | G06Q 30/0229 |
| 2019/0164157 | A1* | 5/2019 | Balaraman | H04L 9/3239 |

FOREIGN PATENT DOCUMENTS

| | | | | |
|---|---|---|---|---|
| WO | WO-2007120215 | A2* | 10/2007 | ........ G06Q 20/3827 |
| WO | WO-2012034081 | A1* | 3/2012 | ........ G06Q 20/102 |
| WO | WO-2012034081 | A1* | 3/2012 | ........ G06Q 20/102 |
| WO | WO-2015144971 | A1 | 10/2015 | |
| WO | WO-2017019202 | A1* | 2/2017 | ............ G06Q 20/36 |

OTHER PUBLICATIONS

Sentner, F., Buyer's Guide: Email Encryption Services, RPost—RMail Services, Mar. 2010, 4 pages.

* cited by examiner

AUTHORIZATION OF USE OF CRYPTOGRAPHIC KEYS

BACKGROUND

Key servers provide cryptographic key services including encryption, decryption, electronic signature, electronic verification, etc. An example key server may be used to encrypt a message and/or decrypt a message to ensure the content of the message is secure and preserved.

BRIEF DESCRIPTION OF THE DRAWINGS

Wherever possible, the same reference numbers will be used throughout the drawing(s) and accompanying written description to refer to the same or like parts.

DETAILED DESCRIPTION

Examples disclosed herein involve authorizing key services of a key server based on cryptographic payment. In examples herein, a crypto-payment manager authorizes use of keys to encrypt or decrypt messages based on whether a wallet for a request to encrypt or decrypt the message indicates sufficient payment of a cryptographic currency. Thus, examples herein enable a user and/or entity to anonymously receive key services from a key server.

In many instances, entities may seek to secure electronic data and/or messages to their customers using cryptographic services. In such instances, the entities establish agreements with cryptographic service providers to use key servers that authorize use of keys to encrypt or decrypt messages and data. The entities often use traditional banking and finance means (e.g., credit cards, checks, business invoices, etc.). In examples herein, an entity and/or a customer of an entity may anonymously receive key services from a key server. Anonymity may be maintained through examples herein using cryptocurrency wallets created and managed for specific key requests, messages of the key requests, and/or requesting devices of the key requests. Accordingly, a user or entity may have a message encrypted or decrypted without the key server knowing the identity of the user or entity (e.g., similar to a consumer purchasing a candy bar from a vending machine in that the owner of the vending machine may not have a relationship with the consumer purchasing the candy bar despite the consumer being able to receive the candy bar by paying the price of the candy bar). In examples herein, a crypto-payment for a key service is enough to authorize use of a key to encrypt or decrypt a message.

An example method includes analyzing a request from a requesting device for a cryptographic key of key server that may be used to decrypt or encrypt a message and authorizing use of the cryptographic key to decrypt or encrypt the message based on a balance of a cryptocurrency wallet associated with the request.

As used herein, a wallet or cryptocurrency wallet, may be any data structure suitable to store a balance or reflect a balance associated with payments (e.g., crypto-payments) for a particular service. An example crypto-payment, as used herein, refers to a transaction (e.g., a transfer of funds) using cryptographic currency (or cryptocurrency), such as a digital currency that uses block-chain technology.

Figure 1:
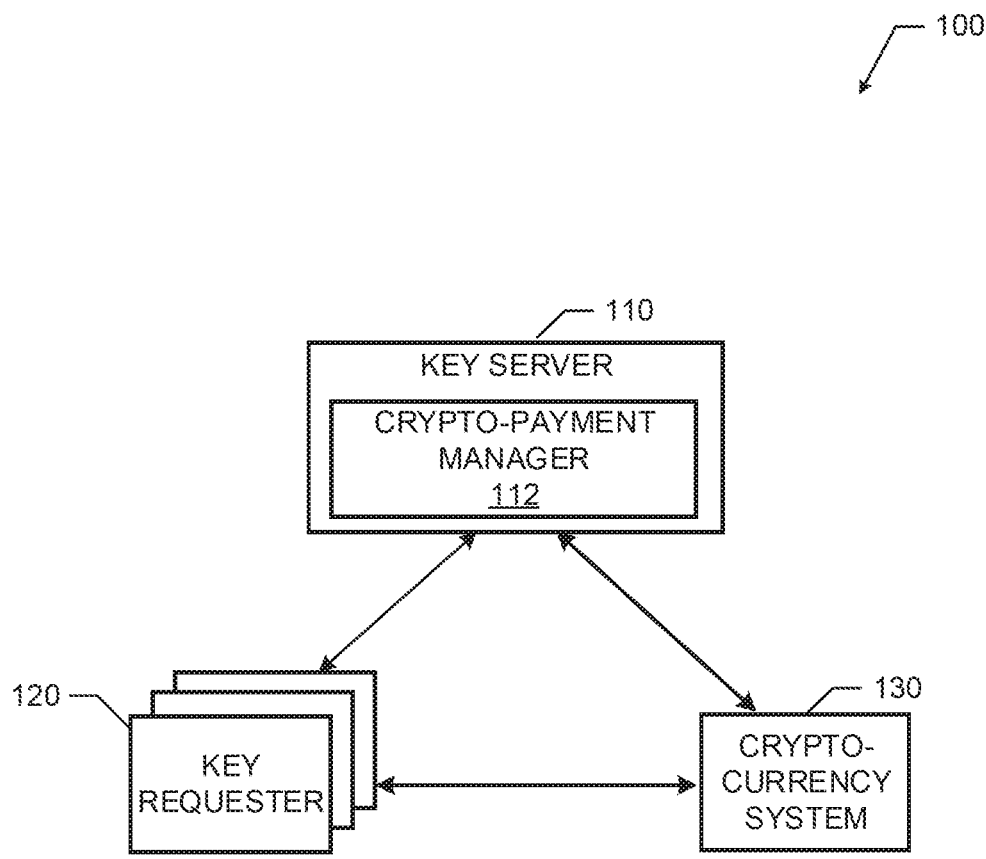
FIG. 1 illustrates a schematic diagram of an example key service system including a key server with a crypto-payment manager implemented in accordance with an aspect of this disclosure.

FIG. 1 is a schematic diagram of an example key service system 100 including an example key server 110 with an example crypto-payment manager 112 implemented in accordance with an aspect of this disclosure. The example key service system 100 includes the key server 110 with the crypto-payment manager 112, key requesters 120, and a cryptocurrency system 130. In examples herein, the key requesters 120 may request the key server 110 for a cryptographic keys (which may be referred to herein interchangeably as keys) to decrypt or encrypt messages and the crypto-payment manager 112 may authorize use of the cryptographic keys based on a balance or status of cryptocurrency wallets associated with the messages and/or the key requesters 120. The example cryptocurrency wallets may be funded using funds from the cryptocurrency system 130. Although a single key server 110 and a single cryptocurrency system 130 are illustrated in the example key service system 100 of FIG. 1, multiple key servers 110 and/or cryptocurrency systems 130 may be included in the key service system 100 and implemented in accordance with examples herein. Further, for purposes of readability, in examples herein, a single key requester 120 may be referred to herein, rather than the collective set of key requesters.

The example key server 110 of FIG. 1 may be any server that authorizes access or use of cryptographic keys. In other words, the key server 110 may provide a cryptographic key service to decrypt or encrypt a message, provide electronic signature, or provide electronic verification of a message/document. For example, the key server 110 may receive requests (e.g., from the key requester 120) to decrypt or encrypt a message (e.g., an email, a direct message, an account managed message (e.g., a message to a registered user of a service, such as banking, retail, etc.). The example key server 110 may use any suitable technique to identify, retrieve, generate, or determine appropriate keys for encryption and/or decryption of a message. For example, the key server 110 may use identity based encryption (IDE) to create or generate keys for requests or messages based on identities (e.g., of the key requester 120, of a user associated with the key requester 120, etc.) associated with the requests. In some examples, the key server 110 may hold keys to decrypt specific messages (e.g., keys corresponding to the messages that the key server 110 encrypted).

In examples herein, the key server 110 may authorize use of keys using the crypto-payment manager 112. For example, the crypto-payment manager 112 may verify that a user and/or requester (e.g., the requester 120) is authorized to use a key to encrypt or decrypt a message based on a balance or state of a cryptocurrency wallet managed by the crypto-payment manager 110. Accordingly, the crypto-payment manager 112 of FIG. 1 may authorize use of a key (or keys) on a pay-per-use basis and/or on a pay-per-time period basis (e.g., similar to a license). An example implementation of the crypto-payment manager 112 is described below in connection with FIG. 2.

Each of the example key requesters 120 may be any suitable device to request a key from the key server 110 to encrypt or decrypt a message. For example, a key requester 120 may be any computing device, such as a computer, a mobile device (e.g., a smartphone, tablet computer, mp3 player, etc.), a server, etc. that is communicatively coupled (e.g., via a network) with the key server 120. In examples herein, key requesters 120 may be accessible to a single authorized user/entity or multiple authorized users/entities, and as such may include or be implemented by a user interface, to facilitate user interaction with the key requester 120, the key server 110, and/or the cryptocurrency system 130. Further, in examples herein, the key requesters 120 may prompt user(s)/entity(ies) via the user interface for additional information, authorization, or any other type of interaction. Any suitable identifier (e.g., a MAC address of the key requester 120, an internet protocol (IP) address of the key requester 120, an electronic serial number (ESN), an international mobile station equipment identity (IMEI), a mobile equipment identification number (MEID) of the key requester 120, etc.) may be used to identify or register a key requester 120 (e.g., with the key server 110). The example key requester 120 may request a key from the key server 110 in response to a user input (e.g., to decrypt a message or encrypt a message), in response to receiving an encrypted message, in response to instructions to send an encrypted message, etc.

The example cryptocurrency system 130 may be any type of cryptocurrency system that involves cryptographic currency. For example, the cryptocurrency system 130 may enable payment via block-chain technology, such as Bitcoin, Litecoin, Dogecoin, etc. In the illustrated example of FIG. 1, the key requester 120 may communicate or be associated with the cryptocurrency system 130. As such, the key requester 120 may receive funds from the cryptocurrency system 130 using any suitable technique. In some examples, the key requester 120 may store or have access to authorized funds from the crypto-currency system 130. Accordingly, in examples herein, the key requester 120 may receive/retrieve funds from the cryptocurrency system 130 and provide crypto-payments (or funds) to the crypto-payment manager for use of keys from the key server 110. In examples herein, payments or funds of the crypto-currency system 130 may be in units or fractions of units. An advantage of the crypto-currency system 130 includes an ability to pay in small fractions (e.g., one millionth of a unit or smaller) of units of the cryptocurrency system for services (e.g., for key services of the key server 110). Furthermore, using the cryptocurrency of the cryptocurrency system 130 to access or use a key enables a user to anonymously receive access to a key. In other words, a user of the key requester 120 may not necessarily establish a pre-existing relationship with the key server 110 (or owner/entity of the key server 110) to receive services of the key server 110.

Figure 2:
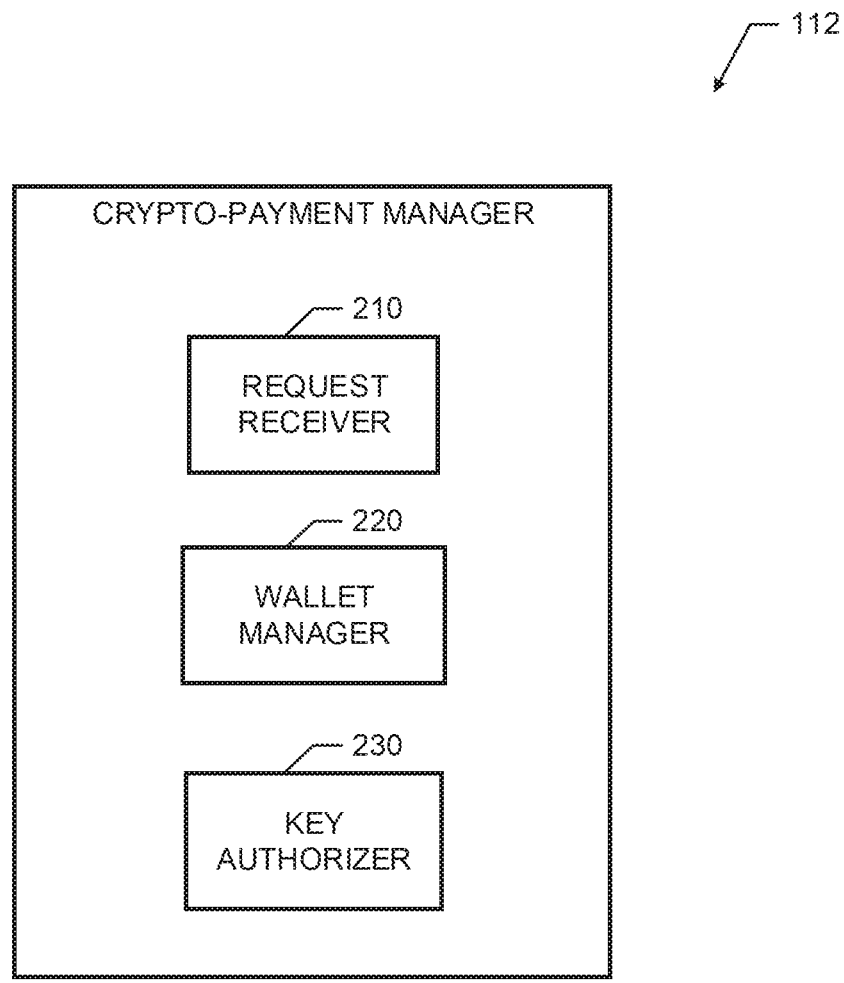
FIG. 2 a block diagram of an example crypto-payment manager that may be used to implement the crypto-payment manager of FIG. 1.

FIG. 2 is a block diagram of an example crypto-payment manager 112 that may be used to implement the crypto-payment manager 112 of FIG. 1. The example crypto-payment manager 112 of FIG. 2 includes a request receiver 210, a wallet manager 220, and a key authorizer 230. In examples herein, the request receiver 210 receives requests from the key requesters 120 for keys to encrypt or decrypt a message (and/or for electronic signature, verification, etc.). Further, the wallet manager 220 maintains or manages wallets associated with requests, messages of requests, key requesters (e.g., the key requesters 120), and/or users (e.g., a user of the key requester 120). Finally, the key authorizer 230 determines whether a cryptocurrency wallet (e.g., a balance) associated with the request satisfies a threshold (or state) to enable use of the key. In some examples, the crypto-payment manager 112 of FIG. 2 may then enable access to content of the message or return a decrypted message to the requesting device 120.

The example request receiver 210 of FIG. 2 receives requests for keys from the key requester 120. In some examples, the request receiver 210 may analyze or parse the request from the key requester 120 for information corresponding to a type of key service to be performed. For example, the request receiver 210 may identify a type of key service to be performed (e.g., encryption, decryption, electronic signature, verification, etc.), a message and whether the message is to be encrypted or decrypted using a key from the key server 110, an identifier associated with the requester (e.g., the key requester 120), and/or a user associated with a message of the request (e.g., a recipient or author/sender of the message, etc.). In some examples, the request receiver 210 may identify crypto-payments in a request for key service, which may be forwarded to the wallet manager 220 to set the balance or status of the cryptocurrency wallet.

The example wallet manager 220 of FIG. 2 maintains cryptocurrency wallets for services to be performed by the key server. For example, the wallet manager 220 may create a wallet, remove a wallet, monitor a wallet (e.g., for a length of time corresponding to a license for a key), etc. Furthermore, the wallet manager 220 may withdraw or deposit cryptocurrency corresponding to crypto-payments for key services of the key server 110. In some examples, the wallet manager 220 may maintain a status (e.g., active or inactive) based on a time period for authorizing use of keys for a particular message, request, or key requester 120. For example, a crypto-payment may be made to authorize use of a key for period of time (e.g., a month, a week, a year, etc.), similar to a license. In other words, the use of the key may be authorized for a period of time from the time the crypto-payment was received, from the time the key was first accessed, etc. In some examples, the time period may correspond to a particular time period during which a payment was made. For example, if a crypto-payment was received during a particular month to access a key, the key requester 120 may have access to that key for the remainder of the month, but may need to resubmit a payment to access the key (or another key) the following month. In such an example, the wallet manager 220 may be able to clear or reset such cryptocurrency wallets to deactivate the cryptocurrency wallets at the beginning of the corresponding time period (e.g., the week, the month, the year, etc.). Accordingly, the wallet manager 220 may indicate that a wallet for a particular message, request, or key requester 120 is active during the designated time period and inactive outside of the designated time period.

In examples herein, the wallet manager 220 may identify, create, and maintain wallets based on a received request from the key requester 120. For example, the wallet manager 220 may manage a database of wallets corresponding to received requests for key services. The example database may be included within a memory of the crypto-payment manager 112, of the key server 110, or any other type of memory in communication with the crypto-payment manager 112. In examples herein, the wallets may be organized, stored, and created based on corresponding requests for key services of the key server 110. For example, the wallet manager 220 may create a wallet in response to receiving a request for use of a key (e.g., to decrypt a message, to encrypt a message, etc.), store cryptocurrency balance information in the wallet for authorizing use of keys, withdraw or deposit funds based on authorized use of keys, and clear or remove inactive wallets from the database.

The example wallet manager 220 of FIG. 2 may create wallet identifiers for the cryptocurrency wallets based on the requests received from the key requester 120. For example, the wallet identifiers may be an identifier associated with a message (e.g., a message serial number, a hash of the message, etc.) in the request, an identifier associated with the request, an identifier associated with the key requester 120, an identifier associated with an entity associated with the message (e.g., a sender or recipient of the message), etc. Accordingly, the wallet manager 220 may establish wallets for requests without establishing a relationship or agreement (e.g., a contractual agreement) with an entity of the request because the wallet is automatically created and maintained based on the message, the request, and/or the key requester 120.

In examples herein, the wallet manager 220 may identify crypto-payments (in the form of cryptocurrency) made to the key server 110 associated with a request for key services as well as key services provided by the key server 110 in response to the request. The example wallet manager 220 may accordingly adjust balances or statuses of the cryptocurrency wallets based on the received crypto-payments and authorized uses rendered (e.g., authorized uses of keys) by the key server 110 for particular requests. As mentioned herein, because cryptocurrency wallets may be maintained for particular messages and/or for particular entities of the messages (e.g., senders of the messages or recipients of the messages), the balances may be adjusted based on whether a use of a key is authorized for a particular message and/or whether use of a key is authorized for a particular entity of the message. Accordingly, in some examples, each time a key is authorized for use in encrypting or decrypting a message, the balances may be adjusted to accommodate a pay-per-use key service.

Accordingly, the example wallet manager 220 of FIG. 2 may identify a message of the request (which may have been received from the request receiver 210) and determine whether a cryptocurrency wallet exists for the message. The wallet manager 220 may determine whether a wallet exists for the message based on an identifier associated with the request and/or an identifier associated with the message. For example, the wallet manager 220 may identify an identifier (e.g., a message number, a hash of the message, etc.) of the message, an identifier of the requesting device, an identifier associated with a user or entity of the message (e.g., a sender or recipient of the message), etc. The wallet manager 220 may then determine whether a cryptocurrency wallet exists for that identifier. If no wallet exists with the corresponding identifier for the message, the wallet manager 220 may create a wallet for the message (e.g., which may be identified by a message identifier, request identifier, entity identifier, etc.), and reply to the key requester 120 that requested service (and/or to another key requester 120 that requested key service associated with the request, such as encryption of the message) to deposit funds for the request or message. If a cryptocurrency wallet exists for the request (or the key requester 120, or a user of the key requester 120), the wallet manager 220 may indicate a balance or status of the wallet to the key authorize 230.

In some examples, if multiple wallets exists for a request (e.g., a wallet for the message, a wallet for the key requester 120, and/or a wallet for a user of the key requester 120), the wallet manager 122 may use a hierarchy (e.g., which may be predetermined or customized based on settings of the crypto-payment manager 110) to determine which wallet is to be used to authorize use of the key. For example, a wallet for a message may be used for authorization over a wallet for a key requester 120, and thus funds may be withdrawn from the wallet for the message. In some examples, when a balance or status of a first wallet in a hierarchy does not authorize use of a key, a subsequent wallet in the hierarchy may be used to authorize use of the key.

In examples herein, the key requester 120 may be an entity seeking to send secure messages (e.g., a bank, a university, an employer, etc.) when the key requester 120 requests that a key be encrypted. The key requester 120 may be associated with a recipient of an encrypted message from such an entity in response to the key requester 120 sending a request that a message be decrypted. Accordingly, in some examples, a same message may be encrypted and decrypted by the key server 110. In such examples, the crypto-payment manager 112 may generate a cryptocurrency wallet specifically for the message when a request is received from a message encryption key requester 120, such that, when a request for a key to encrypt the message is made, the wallet manager 220 may create a cryptocurrency wallet for that message. Thus, when a subsequent request for a key to decrypt that message is received from a message decryption key requester 120, the wallet manager 220 uses the cryptocurrency wallet for the message to determine whether to authorize use of the key to decrypt the message. Accordingly, the key requester 120 that requests a key to encrypt the message may fund the cryptocurrency wallet for that particular message to be decrypted following a request from a separate key requester 120 to provide a key to decrypt the message.

In some examples, the wallet manager 220 may communicate crypto-payment transactions to the crypto-currency system 130. For example, the wallet manager 220 (and/or the key requester 120) may indicate the transfer or receipt of funds in a ledger of the crypto-currency system 130.

The example key authorizer 230 authorizes use of keys based on a balance or status received from the wallet manager 220. For example, the key authorizer 230 may identify a cost for authorization of a key, and if the balance satisfies the cost (or threshold) for use of the key, the key authorizer 230 may authorize the use of the key. Accordingly, the key authorizer 230 may enable the key requester to access the key to encrypt a message, decrypt a message, executed an electronic signature, perform verification, etc.

In examples herein, where the balance does not satisfy a threshold to authorize use of the key, the key authorizer 230 may instruct the key requester 120 (and/or another key requester 120 associated with the message) to add sufficient funds to the cryptocurrency wallet managed by the wallet manager 220. Furthermore, in some examples, the key authorizer 230 may verify an active status of the wallet when crypto-payments are received to allow use of a key for a particular period of time. For example, if the request is received at a time during the particular (or active) period of time, then the cryptocurrency wallet may indicate an active status. If the key authorizer 230 determines that the wallet is inactive at the present time, the key authorizer 230 may instruct the key requester 120 (and/or another key requester 120 associated with the message) to renew authorization for a subsequent time period (e.g., renew a license) or add funds for use of the key by the key requester 120. In examples herein, when the key authorizer 230 authorizes use of a key, the key authorizer 230 may indicate such a use to the wallet manager 220 for corresponding deduction of funds from the corresponding wallet.

While an example manner of implementing the crypto-payment manager 112 of FIG. 1 is illustrated in FIG. 2, at least one of the elements, processes and/or devices illustrated in FIG. 2 may be combined, divided, re-arranged, omitted, eliminated and/or implemented in any other way. Further, the request receiver 210, the wallet manager 220, the key authorizer 230 and/or, more generally, the example crypto-payment manager 112 of FIG. 2 may be implemented by hardware and/or any combination of hardware and executable instructions (e.g., software and/or firmware). Thus, for example, any of the request receiver 210, the wallet manager 220, the key authorizer 230 and/or, more generally, the example crypto-payment manager 112 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the request receiver 210, the wallet manager 220, and/or the key authorizer 230 is/are hereby expressly defined to include a tangible machine readable storage device or storage disk such as a memory, a digital versatile disk (DVD), a compact disk (CD), a Blu-ray disk, etc. storing the executable instructions. Further still, the example crypto-payment manager 112 of FIG. B may include at least one element, process, and/or device in addition to, or instead of, those illustrated in FIG. 2, and/or may include more than one of any or all of the illustrated elements, processes and devices.

Figure 3:
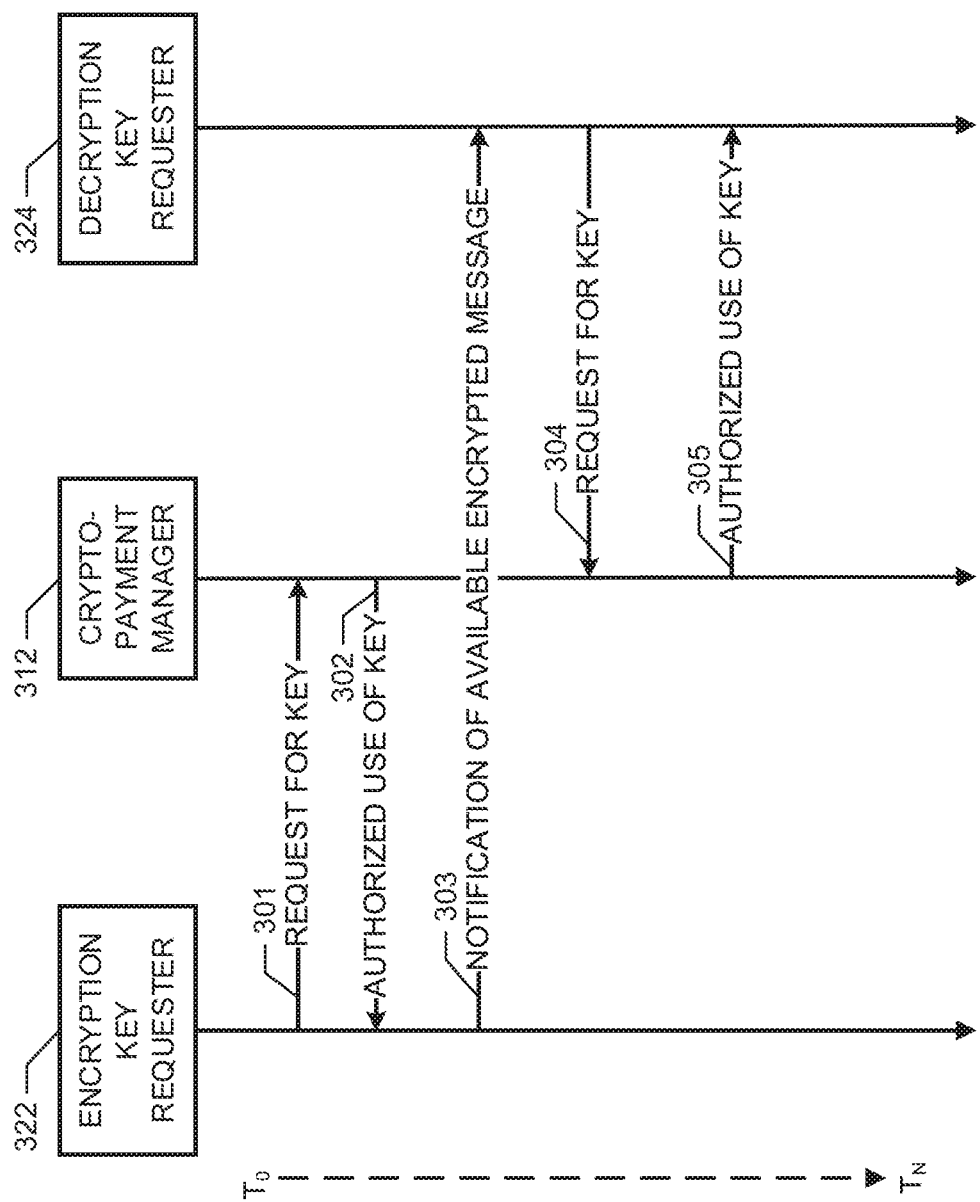
FIG. 3 is a message diagram representative of example communications to and from the crypto-payment manager of FIG. 2 to authorize use of a key or keys to encrypt and decrypt a message in accordance with an aspect of this disclosure.

FIG. 3 is an example message diagram illustrating example communications that may occur between components of the key service system 100 of FIG. 1 during a period of time from $T_0$ to $T_N$. In FIG. 3, a crypto-payment manager 312 (which may be implemented by the crypto-payment manager 112 of FIG. 1 or 2) communicates with an encryption key requester 322 and a decryption key requester 324. The example messages of FIG. 3 may be sent to enable the encryption key requester 322 (e.g., a service entity) to send an encrypted message to a decryption key requester 324 (e.g., a customer of the service entity) using a key server with the crypto-payment manager 312.

In the example of FIG. 3, the encryption key requester 322 sends a request (301) for a key to encrypt a message. Upon receipt of the request (301), the crypto-payment manager 312 may verify that there are sufficient funds in a crypto-currency wallet associated with the request to encrypt the message. For example, the request (301) may have included a crypto-payment for the encryption. The crypto-payment manager 312 authorizes use (302) of the key and encrypts the message of the request. The encryption key requester 322 sends a notification (303) to the decryption key requester 324 that there is an available encrypted message. The decryption key requester 324 sends a request (304) to decrypt the message. Upon receipt of the request (304), the crypto-payment manager 312 may verify sufficient funds to authorize use of a key to decrypt the message. For example, a crypto-payment may have been provided in the request (301) from the encryption key requester 322 and/or from the request (304) from the decryption key requester 324. The crypto-payment manager authorizes use (305) of the key to decrypt the message of the requests of (301, 304).

Figure 4:
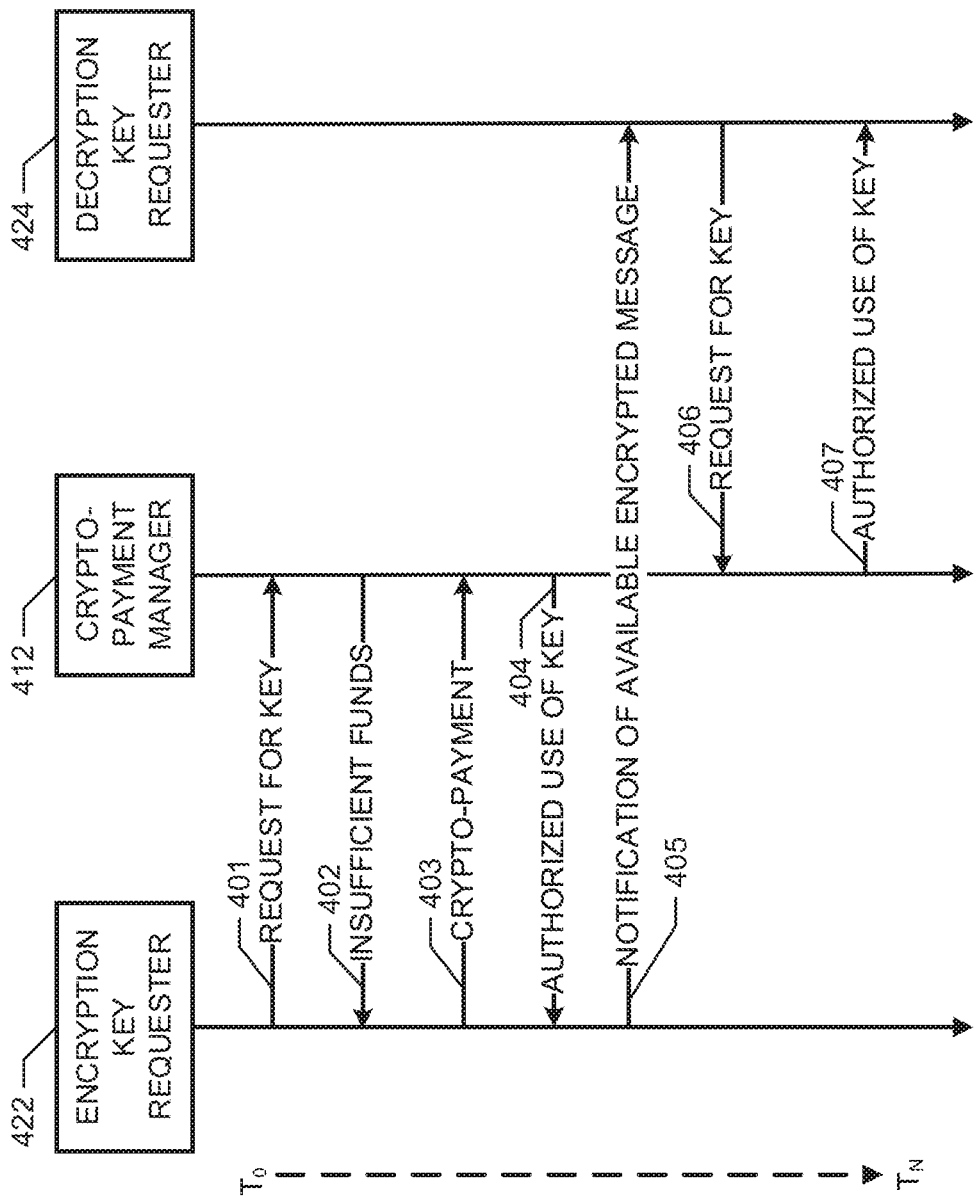
FIG. 4 is a message diagram representative of example communications to and from a crypto-payment manager, such as the crypto-payment manager of FIG. 2, to request a crypto-payment to encrypt a message in accordance with an aspect of this disclosure.

FIG. 4 is another example message diagram illustrating example communications that may occur between components of the key service system 100 of FIG. 1 during a period of time from $T_0$ to $T_N$. In FIG. 4, a crypto-payment manager 412 (which may be implemented by the crypto-payment manager 112 of FIG. 1 or 2) communicates with an encryption key requester 422 and a decryption key requester 424. The example messages of FIG. 4 may be sent to enable the encryption key requester 422 (e.g., a service entity) to send an encrypted message to a decryption key requester 524 (e.g., a customer of the service entity) using a key server with the crypto-payment manager 412 and to enable the encryption key requester 422 to make a crypto-payment to encrypt the message.

In the example of FIG. 4, the encryption key requester 422 sends a request (401) for a key to encrypt a message. Upon receipt of the request (401), the crypto-payment manager 412 may determine that there are insufficient funds in a cryptocurrency wallet associated with the request to encrypt the message. The crypto-payment manager 412 may then send a notification (402) to the encryption key requester 422 that there are insufficient funds to encrypt the message. In response, the encryption key requester 422 may provide a crypto-payment (403) to the crypto-payment manager 412. The crypto-payment manager 412 authorizes use (404) of the key and encrypts the message of the request. The encryption key requester 422 sends a notification (405) to the decryption key requester 424 that there is an available encrypted message. The decryption key requester 424 sends a request (406) to decrypt the message. Upon receipt of the request (406), the crypto-payment manager 412 may verify sufficient funds to authorize use of a key to decrypt the message. For example, a crypto-payment may have been provided in the crypto-payment (403) from the encryption key requester 422 and/or from the request (406) from the decryption key requester 424. The crypto-payment manager authorizes use (407) of the key to decrypt the message of the requests of (401, 406). Upon receipt of the authorized use of the key (407), the decryption key requester 424 may access the content of the message of the requests (401, 406).

Figure 5:
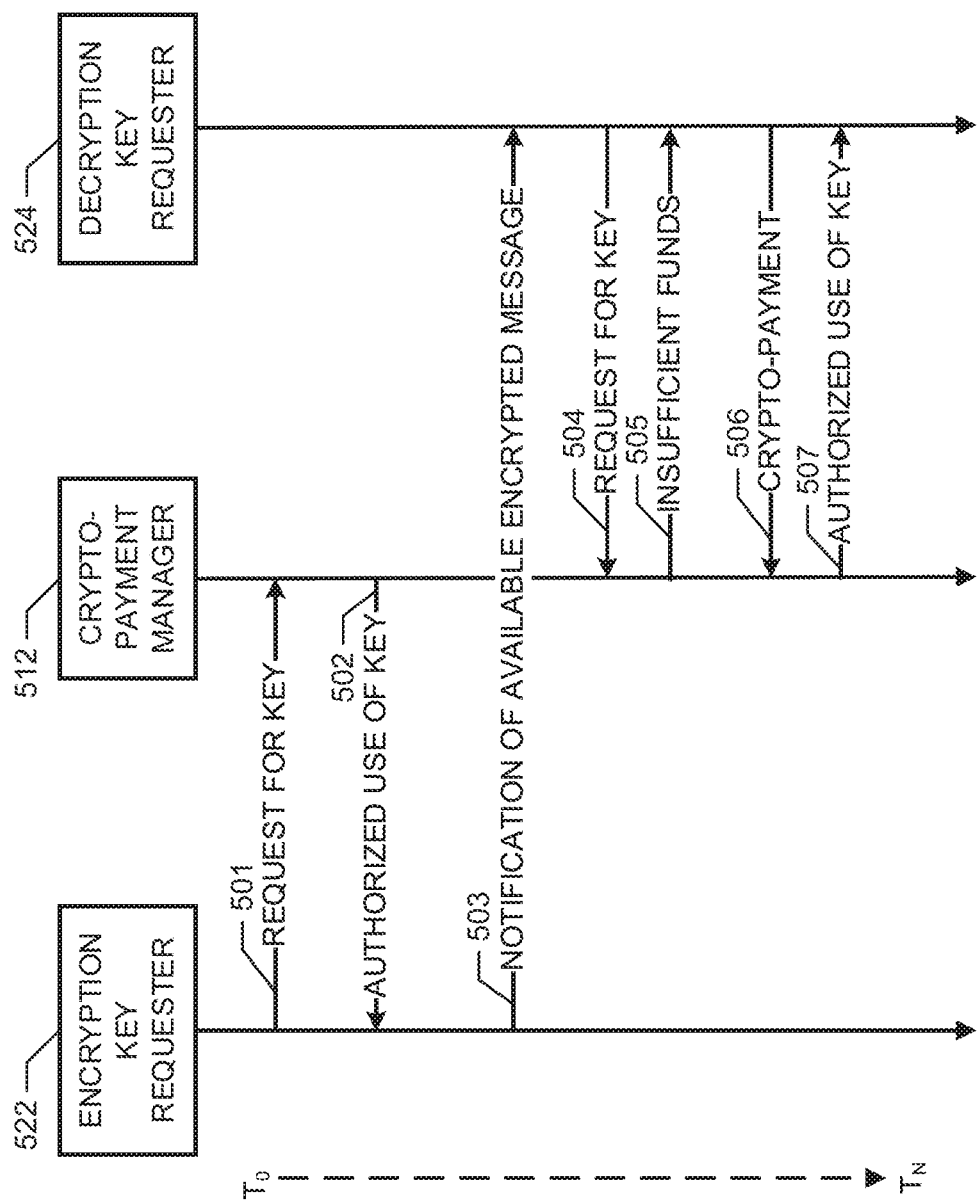
FIG. 5 is a message diagram representative of example communications to and from a crypto-payment manager, such as the crypto-payment manager of FIG. 2, to request a crypto-payment to decrypt a message in accordance with an aspect of this disclosure.

FIG. 5 is another example message diagram illustrating example communications that may occur between components of the key service system 100 of FIG. 1 during a period of time from $T_0$ to $T_N$. In FIG. 5, a crypto-payment manager 512 (which may be implemented by the crypto-payment manager 112 of FIG. 1 or 2) communicates with an encryption key requester 522 and a decryption key requester 524. The example messages of FIG. 5 may be sent to enable the encryption key requester 522 (e.g., a service entity) to send an encrypted message to a decryption key requester 524 (e.g., a customer of the service entity) using a key server with the crypto-payment manager 512 and to enable the encryption key requester 522 to make a crypto-payment to decrypt the message.

In the example of FIG. 5, the encryption key requester 522 sends a request (501) for a key to encrypt a message. Upon receipt of the request (501), the crypto-payment manager 512 may verify that there are sufficient funds in a cryptocurrency wallet associated with the request to encrypt the message. For example, the request 501 may have included a crypto-payment for the encryption. The crypto-payment manager 512 authorizes use (502) of the key and encrypts the message of the request. The encryption key requester 522 sends a notification (503) to the decryption key requester 524 that there is an available encrypted message. The decryption key requester 524 sends a request 504 to decrypt the message. Upon receipt of the request (504), the crypto-payment manager 512 may determine that there are insufficient funds in a cryptocurrency wallet associated with the request (504) to decrypt the message. The crypto-payment manager 512 may then send a notification (505) to the decryption key requester 524 that there are insufficient funds to encrypt the message. In response, the decryption key requester 524 may provide a crypto-payment (506) to the crypto-payment manager 512. In some examples, the crypto-payment manager 112 may send the insufficient funds notification (505) to the encryption key requester 522, which may then provide the crypto-payment (506) to the crypto-payment manager 112. After receiving the crypto-payment (506), the crypto-payment manager 512 authorizes use (507) of the key and decrypts the message of the requests (501, 504). Upon receipt of the authorized use of the key, the decryption key requester 524 may access the content of the message of the requests (501, 504).

Figure 6:
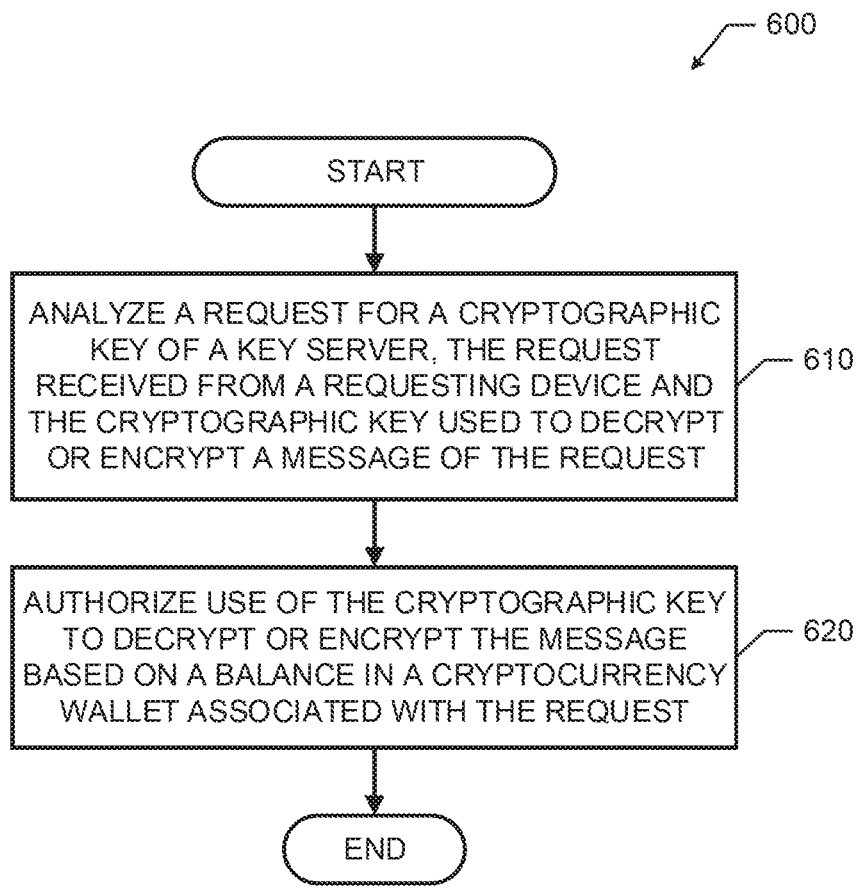
FIG. 6 is a flowchart representative of example machine readable instructions that may be executed to implement the crypto-payment manager 112 of FIG. 2 in accordance with an aspect of this disclosure.
Figure 7:
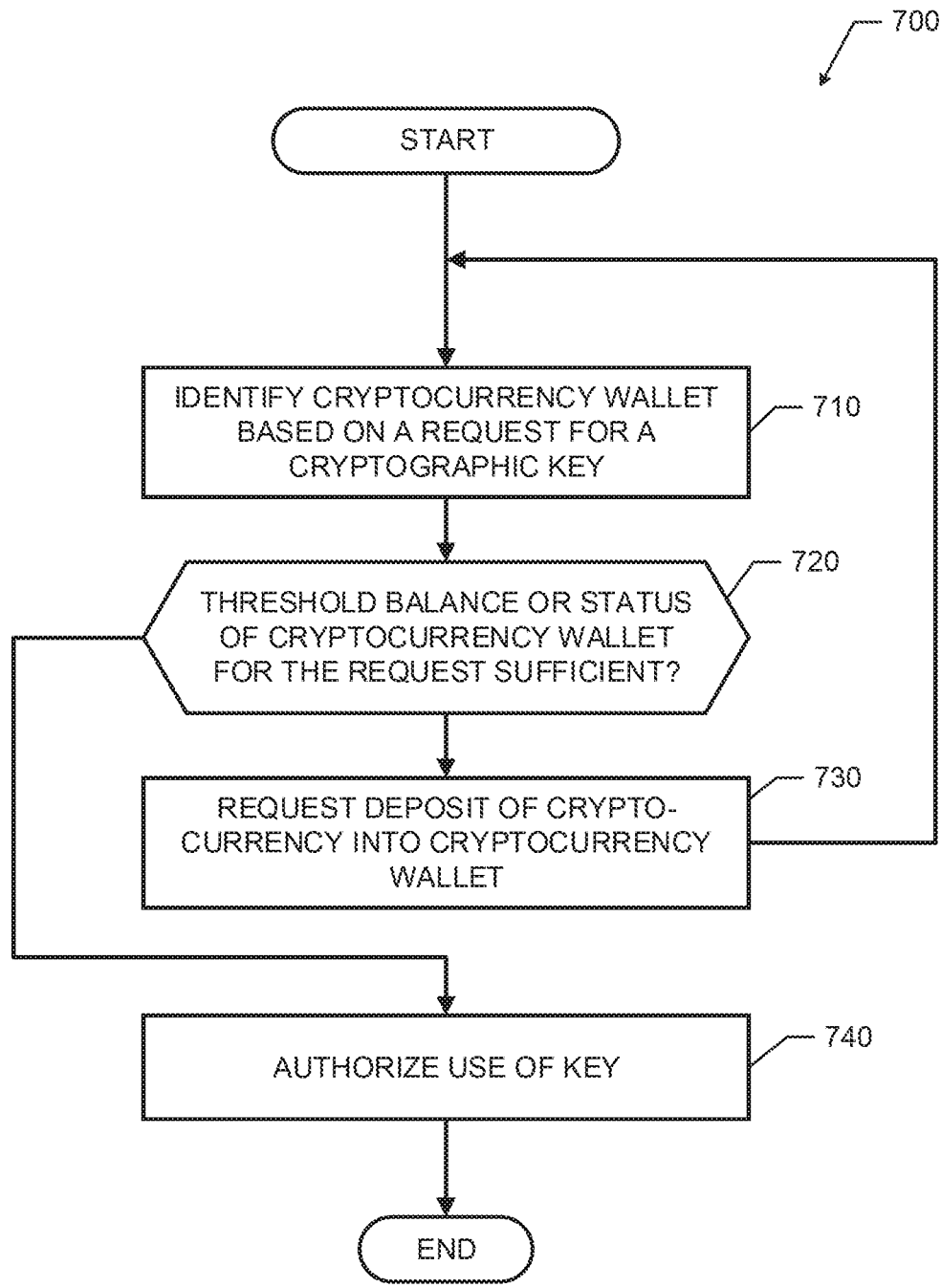
FIG. 7 is a flowchart representative of an example portion of the example machine readable instructions of FIG. 6 to implement the crypto-payment manager of FIG. 2 in accordance with an aspect of this disclosure.
Figure 8:
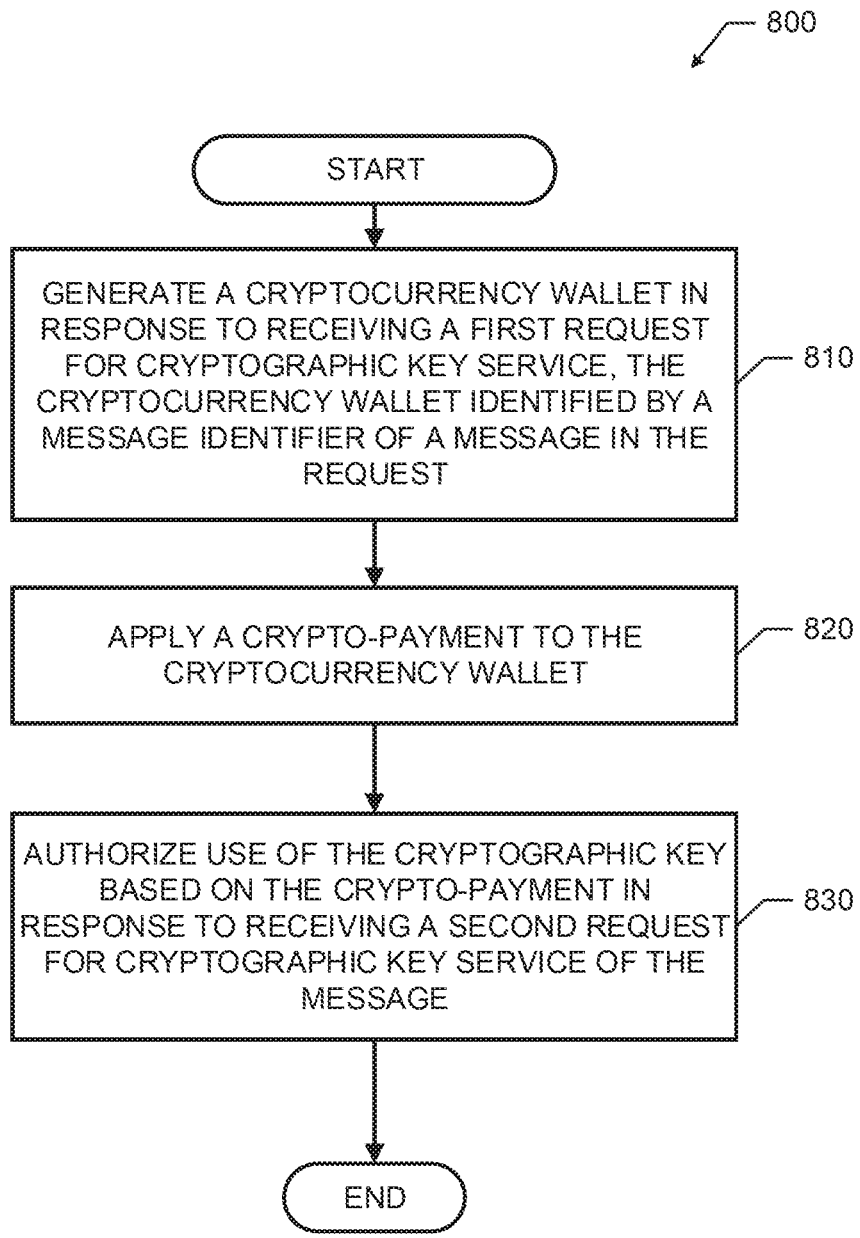
FIG. 8 is another flowchart representative of example machine readable instructions that may be executed to implement the crypto-payment manager 112 of FIG. 2 in accordance with an aspect of this disclosure.

Flowcharts representative of example machine readable instructions for implementing the crypto-payment manager 110 of FIG. 2 are shown in FIGS. 6, 7, and 8. In this example, the machine readable instructions comprise a program/process for execution by a processor such as the processor 912 shown in the example processor platform 900 discussed below in connection with FIG. 9. The program/process may be embodied in executable instructions (e.g., software) stored on a tangible machine readable storage medium such as a CD-ROM, a floppy disk, a hard drive, a digital versatile disk (DVD), a Blu-ray disk, or a memory associated with the processor 912, but the entire program/process and/or parts thereof could alternatively be executed by a device other than the processor 912 and/or embodied in firmware or dedicated hardware. Further, although the example program is described with reference to the flowchart illustrated in FIGS. 6, 7, and 8, many other methods of implementing the example crypto-payment manager 112 may alternatively be used. For example, the order of execution of the blocks may be changed, and/or some of the blocks described may be changed, eliminated, or combined.

The example process 600 of FIG. 6 begins with an initiation of the crypto-payment manager 112 (e.g., upon startup, upon instructions from a user, upon startup of a device implementing the crypto-payment manager 112 (e.g., the key server 110), etc.). The example process 600 of FIG. 6 may be executed to authorize use of a cryptographic key based on a balance of a cryptocurrency wallet associated with request for the cryptographic key. At block 610, the request receiver 210 analyzes a request for a cryptographic key of a key server. The example request of block 610 may be received from a requesting device (e.g., the key requester 120) and the cryptographic key is used to decrypt or encrypt a message of the request. At block 620, the key authorizer 230 authorizes use of the cryptographic key to decrypt or encrypt the message based on a balance in a cryptocurrency wallet associated with the request. The example cryptocurrency wallet of block 620 may be managed and maintained by the wallet manager 220. The cryptocurrency wallet may be associated with the request based on a message of the request, based on the request itself, based on an entity or user associated with the request. After block 620, the example process 600 ends. After block 620, the requesting device may have access to a cryptographic key to encrypt or decrypt a message provided that sufficient crypto-payments were made to the key server.

The example process 700 of FIG. 7 begins with an initiation of the crypto-payment manager 112. The example process 700 of FIG. 7 may be executed to determine whether to authorize use of a cryptographic key based on a balance of a cryptocurrency wallet associated with a request for the cryptographic key. The example process 700 may be executed to implement block 620 of FIG. 6. At block 710 of the example process 700, the wallet manager 220 identifies a cryptocurrency wallet based on a request for a cryptographic key. For example, at block 710, the wallet manager 220 may identify an identifier of the request, and identifier of a message in the request, an identifier of an entity associated with the message, etc. At block 720, the key authorizer 230 determines whether a threshold balance or status of the cryptocurrency wallet for the request is sufficient. For example, the key authorizer 230 may determine whether the cryptocurrency wallet has at least a minimum balance to authorize use of the key and/or whether the cryptocurrency wallet indicates an active status for a current time period to authorize use of the key.

If the threshold balance of or status of the cryptocurrency wallet for the request is not sufficient (block 720), then the key authorizer 230 requests a deposit of cryptocurrency into the cryptocurrency wallet (i.e., a crypto-payment) at block 730. After block 730, control returns to block 710 for a subsequent request. If, at block 720, the key authorizer 230 determines that the threshold balance or the status of the cryptocurrency wallet for the request is sufficient, then the key authorizer 230 authorizes use of the key. After block 740, the example process 700 ends.

The example process 800 of FIG. 8 begins with an initiation of the crypto-payment manager 112. The example process 800 may be executed to encrypt and/or decrypt a message using the key server 110 and the crypto-payment manager 112. At block 810, the wallet manager 220 generates a cryptocurrency wallet in response to the request receiver 210 receiving a first request for cryptographic key service (e.g., to encrypt a message). The wallet manager 220 may identify the cryptocurrency wallet by a message identifier of a message in the request. At block 820, the wallet manager 820 applies a crypto-payment to the cryptocurrency wallet. At block 830, the key authorizer 230 authorizes use of the cryptographic key based on the crypto-payment in response to receiving a second request for cryptographic key service (e.g., to decrypt the message). The example first request may be from a business entity and the example second request may be from a customer of the business entity. The example crypto-payment of block 820 may be from a key requester 120 requesting to encrypt the message or a key requester 120 requesting to decrypt the message. After block 830, the example process ends.

As mentioned above, the example processes of FIGS. 6, 7, and 8 may be implemented using coded instructions (e.g., computer and/or machine readable instructions) stored on a tangible machine readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible machine readable storage medium is expressly defined to include any type of machine readable storage device and/or storage disk and to exclude propagating signals and to exclude transmission media. As used herein, "computer readable storage medium" and "machine readable storage medium" are used interchangeably. Additionally or alternatively, the example processes of FIGS. 6, 7, and/or 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory machine readable medium is expressly defined to include any type of machine readable storage device and/or storage disk and to exclude propagating signals and to exclude transmission media.

As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 9:
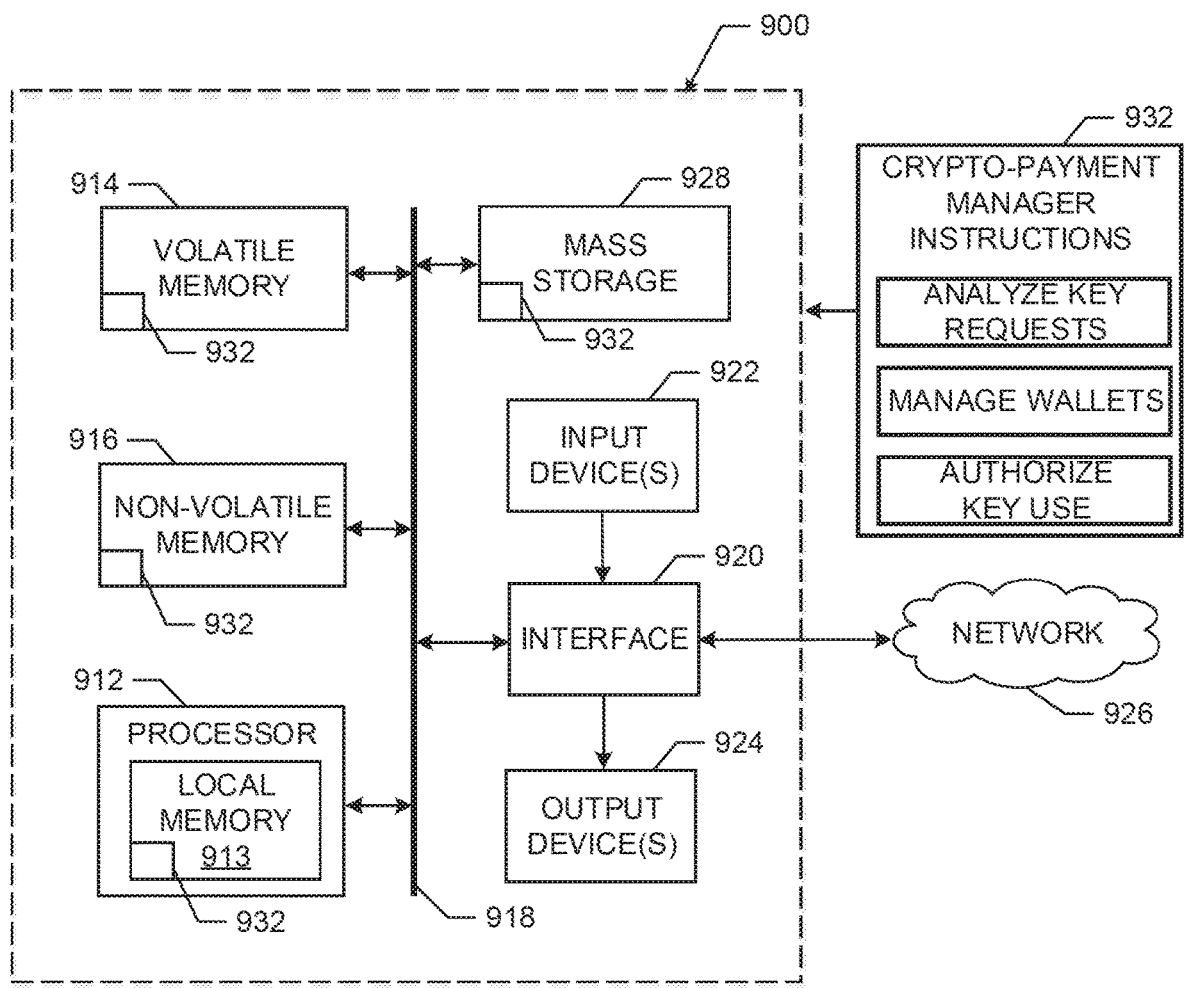
FIG. 9 is a block diagram of an example processor platform capable of executing the instructions of FIGS. 6 and/or 7 to implement the crypto-payment manager of FIG. 2 in accordance with an aspect of this disclosure.

FIG. 9 is a block diagram of an example processor platform 900 capable of executing the instructions of FIGS. 6, 7, and/or 8 to implement the crypto-payment manager 112 of FIG. 2. The example processor platform 900 may be or may be included in any type of apparatus, such as a server (e.g., a key server), a personal computer, or any other type of computing device.

The processor platform 900 of the illustrated example of FIG. 9 includes a processor 912. The processor 912 of the illustrated example is hardware. For example, the processor 912 can be implemented by at least one integrated circuit, logic circuit, microprocessor or controller from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM). RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a peripheral component interconnect (PCI) express interface.

In the illustrated example, at least one input device 922 is connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

At least one output device 924 is also connected to the interface circuit 920 of the illustrated example. The output device(s) 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, may include a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes at least one mass storage device 928 for storing executable instructions (e.g., software) and/or data. Examples of such mass storage device(s) 928 include floppy disk drives, hard drive disks, compact disk drives, Blu-ray disk drives, RAID systems, and digital versatile disk (DVD) drives.

The coded instructions 932 (e.g., to analyze key requests, to manage wallets, to authorize key use) of FIGS. 6, 7, and/or 8 may be stored in the mass storage device 928, in the local memory 913 in the volatile memory 914, in the non-volatile memory 916, and/or on a removable tangible machine readable storage medium such as a CD or DVD. The From the foregoing, it is to be appreciated that the above disclosed methods, apparatus and articles of manufacture enable authorization of cryptographic keys based cryptocurrency payments managed an maintained in cryptocurrency wallets corresponding to requests for the cryptographic keys. Accordingly, in examples herein, an entity or user may receive a key service from a key server anonymously. For example, a key requester may receive authorization to use a cryptographic key based on a cryptocurrency payment without establishing a relationship or agreement with the key server. Furthermore, examples enable a pay-per-use key service and/or a pay-per-time period key service (e.g., a license) without any contractual agreement between the user or entity and the key server.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   anonymously receiving a first request for an electronic cryptographic key service for encrypting an electronic message provided by a key server, wherein the first request for encrypting the electronic message includes an identifier identifying a cryptocurrency wallet associated with the first request for encrypting the electronic message, and wherein the identifier does not identify a user requesting the electronic cryptographic key service;

determining the cryptocurrency wallet associated with the first request has sufficient funds to authorize the first request, wherein the cryptocurrency wallet associated with the first request is stored in a database, and wherein determining the cryptocurrency wallet associated with the first request has sufficient funds to authorize the first request comprises communicating with a cryptocurrency system using block-chain technology;

in response to the cryptocurrency wallet associated with the first request having sufficient funds to authorize the first request:
generating an encryption key for the electronic message;
encrypting the electronic message with the generated encryption key;
storing the encryption key;
transferring a notification to a recipient of the electronic message; and
deducting payment for the first request from the cryptocurrency wallet associated with the first request;

anonymously receiving a second request for the electronic cryptographic key service for encrypting a second electronic message provided by the key server;

determining a cryptocurrency wallet associated with the second request does not have sufficient funds to authorize the second request; and in response to the cryptocurrency wallet associated with the second request not having sufficient funds to authorize the second request, rejecting the second request and transmitting to a user device associated with the second request, a prompt to deposit cryptocurrency into the cryptocurrency wallet associated with the second request to enable a threshold balance to be satisfied.

2. The method as defined in claim 1, further comprising:
receiving a request, from the recipient, to decrypt the electronic message;
determining a second cryptocurrency wallet associated with the request to decrypt the electronic message has sufficient funds to authorize the request to decrypt the electronic message, and in response to determining the second cryptocurrency wallet associated with the request to decrypt the electronic message has sufficient funds to authorize the request to decrypt the electronic message, performing at least one of: permitting access to the electronic message and transferring a decrypted copy of the electronic message; and
in response to the second cryptocurrency wallet associated with the request to decrypt the electronic message not having sufficient funds to authorize the request to decrypt the electronic message, rejecting the request to decrypt the electronic message and transferring a message to a second user device associated with the request to decrypt the electronic message to deposit cryptocurrency into the second cryptocurrency wallet.

3. The method as defined in claim 1, wherein a type of the electronic cryptographic key service requested comprises a pay-per-use service.

4. The method as defined in claim 1, wherein a type of the electronic cryptographic key service requested comprises a pay-per-time-period service.

5. The method as defined in claim 1, wherein the threshold balance comprises an amount of the payment for the request for the electronic cryptographic key service.

6. The method as defined in claim 1, further comprising:
receiving a second request for encrypting the electronic message after the threshold balance is satisfied; and
authorizing the second request for encrypting the electronic message, generating the encryption key for the electronic message, storing the encryption key, and transferring the notification to the recipient of the electronic message.

7. The method as defined in claim 1, wherein transmitting the prompt to the user device to deposit cryptocurrency into the cryptocurrency wallet associated with the request for encryption of the electronic message comprises prompting for user authorization to request a deposit of the cryptocurrency from the cryptocurrency system.

8. The method as defined in claim 1, further comprising:
in response to determining the cryptocurrency wallet associated with the request does not exist, generating the cryptocurrency wallet; and
requesting a crypto-payment deposit into the generated cryptocurrency wallet.

9. The method as defined in claim 8, wherein the cryptocurrency wallet is identified in the database based on the identifier in the request.

10. A non-transitory computer readable storage medium storing instructions executable by a processor to:
anonymously receive, from a user, a request for an electronic cryptographic key service, provided by a key server, for encrypting an electronic message, wherein the request for encrypting the electronic message includes an identifier identifying a cryptocurrency wallet associated with the request for encrypting the electronic message, and wherein the identifier does not identify the user requesting the electronic cryptographic key service;

determine whether the cryptocurrency wallet associated with the request has sufficient funds to authorize the request, wherein the cryptocurrency wallet is stored in a database, and wherein determining whether the cryptocurrency wallet associated with the request has sufficient funds to authorize the request comprises communicating with a cryptocurrency system using block-chain technology;

in response to the cryptocurrency wallet associated with the request having sufficient funds to authorize the request:
generate an encryption key for the electronic message;
encrypt the electronic message with the generated encryption key;
store the encryption key;
transfer a notification to a recipient of the electronic message; and
deduct payment for the request from the cryptocurrency wallet associated with the request; and in response to the cryptocurrency wallet associated with the request not having sufficient funds to authorize the request:
reject the request; and
transmit to a user device associated with the request, a prompt to deposit cryptocurrency into the cryptocurrency wallet associated with the request to enable a threshold balance to be satisfied.

11. The non-transitory computer readable storage medium as defined in claim 10, storing instructions further executable by the processor to:

receive a request from the recipient to decrypt the electronic message;

determine a second cryptocurrency wallet associated with the request to decrypt the electronic message has sufficient funds to authorize the request to decrypt the electronic message; and in response to the second cryptocurrency wallet associated with the request to decrypt the electronic message having sufficient funds to authorize the request to decrypt the electronic message, performing at least one of: permit access to the electronic message and transfer a decrypted copy of the electronic message; and in response to the second cryptocurrency wallet associated with the request to decrypt the electronic message not having sufficient funds to authorize the request to decrypt the electronic message, reject the request to decrypt the electronic message and transfer a message to a second user device associated with the request to decrypt the electronic message to deposit cryptocurrency into the second cryptocurrency wallet.

12. The non-transitory computer readable storage medium as defined in claim 10, wherein a type of the electronic cryptographic key service requested comprises a pay-per-use service.

13. The non-transitory computer readable storage medium as defined in claim 10, wherein a type of the electronic cryptographic key service requested comprises a pay-per-time-period service.

14. The non-transitory computer readable storage medium as defined in claim 10, wherein the threshold balance comprises an amount of the payment for encrypting the electronic message.

15. The non-transitory computer readable storage medium as defined in claim 10, storing instructions further executable by the processor to:

receive a second request for encrypting the electronic message after the threshold balance is satisfied;
authorize the second request for encrypting the electronic message;
generate the encryption key for the electronic message;
store the encryption key; and
transfer the notification to the recipient of the electronic message.

16. The non-transitory computer readable storage medium as defined in claim 10, wherein transmitting the prompt to the user device to deposit cryptocurrency into the cryptocurrency wallet associated with the request for encryption of the electronic message comprises prompting for user authorization to request a deposit of the cryptocurrency from the cryptocurrency system.

17. The non-transitory computer readable storage medium as defined in claim 10, storing instructions further executable by the processor to:

in response to determining the cryptocurrency wallet associated with the request does not exist, generate the cryptocurrency wallet; and
request a crypto-payment deposit into the generated cryptocurrency wallet.

18. A system comprising:
a processor; and
a non-transitory computer-readable data storage medium storing instructions that, when executed by the processor, cause the processor to:

anonymously receive, from a user, a request for an electronic cryptographic key service, provided by a key server, for encrypting an electronic message, wherein the request for encrypting the electronic message includes an identifier identifying a cryptocurrency wallet associated with the request for encrypting the electronic message, and wherein the identifier does not identify the user requesting the electronic cryptographic key service;

determine whether the cryptocurrency wallet associated with the request has sufficient funds to authorize the request, wherein the cryptocurrency wallet is stored in a database, and wherein determining whether the cryptocurrency wallet associated with the request has sufficient funds to authorize the request comprises communicating with a cryptocurrency system using block-chain technology;

in response to the cryptocurrency wallet associated with the request having sufficient funds to authorize the request:
generate an encryption key for the electronic message;
encrypt the electronic message with the generated encryption key;
store the encryption key in the database;
transfer a notification to a recipient of the electronic message; and
deduct payment for the request from the cryptocurrency wallet associated with the request; and in response to the cryptocurrency wallet associated with the request not having sufficient funds to authorize the request:
reject the request; and
transmit to a user device associated with the request, a prompt to deposit cryptocurrency into the cryptocurrency wallet associated with the request to enable a threshold balance to be satisfied.

\* \* \* \* \*